(12) United States Patent
Reynolds, III et al.

(10) Patent No.: US 6,757,154 B2
(45) Date of Patent: Jun. 29, 2004

(54) DOUBLE-LAYER CAPACITOR COMPONENTS AND METHOD FOR PREPARING THEM

(75) Inventors: Robert Anderson Reynolds, III, Bay Village, OH (US); Julian Norley, Chagrin Falls, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 0 days.

(21) Appl. No.: 10/022,596

(22) Filed: Dec. 13, 2001

(65) Prior Publication Data

US 2003/0112580 A1 Jun. 19, 2003

(51) Int. Cl.[7] .................................................. H01G 9/00
(52) U.S. Cl. ........................ 361/502; 361/503; 29/25.03
(58) Field of Search ................................. 361/502, 503, 361/508, 509, 516, 517; 29/25.03

(56) References Cited

U.S. PATENT DOCUMENTS

| | | | |
|---|---|---|---|
| 2,800,616 A | 7/1957 | Becker | 317/230 |
| 3,404,061 A | 10/1968 | Shane et al. | 161/125 |
| 3,648,126 A | 3/1972 | Boos et al. | 317/230 |
| 4,023,079 A * | 5/1977 | Selover et al. | 361/502 |
| 4,327,400 A * | 4/1982 | Muranaka et al. | 361/502 |
| 4,414,607 A * | 11/1983 | Sekido et al. | 361/502 |
| 4,895,713 A | 1/1990 | Greinke et al. | 423/448 |
| 5,555,155 A * | 9/1996 | Patel et al. | 361/503 |
| 5,859,761 A | 1/1999 | Aoki et al. | 361/502 |
| 5,902,762 A | 5/1999 | Mercuri et al. | 501/99 |
| 5,907,472 A | 5/1999 | Farahmandi et al. | 361/502 |
| 6,013,208 A | 1/2000 | Nakamura et al. | 264/29.4 |
| 6,094,788 A | 8/2000 | Farahmandi et al. | 25/25.41 |
| 2002/0012223 A1 | 1/2002 | Okamura et al. | 361/502 |

FOREIGN PATENT DOCUMENTS

| | | |
|---|---|---|
| JP | 11340093 | 12/1999 |
| WO | 0064808 | 11/2000 |

* cited by examiner

*Primary Examiner*—Dean A. Reichard
*Assistant Examiner*—Eric Thomas
(74) *Attorney, Agent, or Firm*—Waddey & Patterson; James R. Cartiglia

(57) ABSTRACT

Components for use in electrochemical double-layer capacitors utilize at least one layer of a flexible graphite sheet material in an electrode or current collector or utilize a tanged metal layer in a current collector.

24 Claims, 5 Drawing Sheets

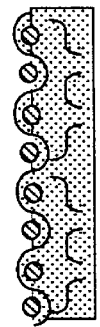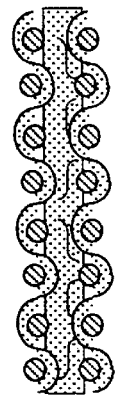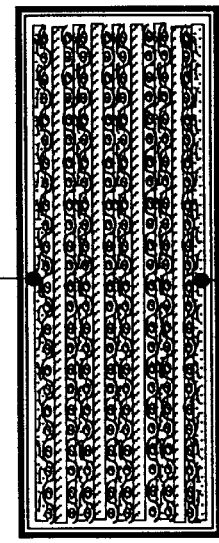
Figure 17
Figure 19
Figure 20
Figure 21
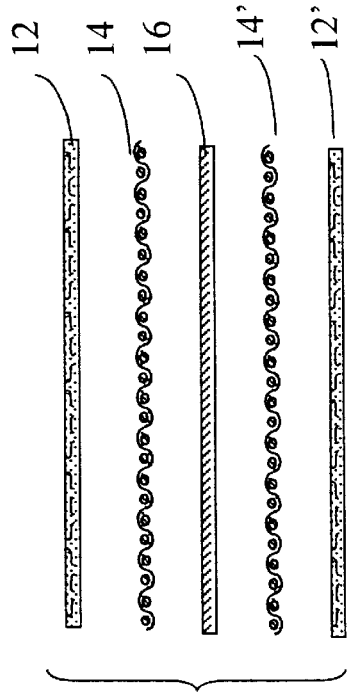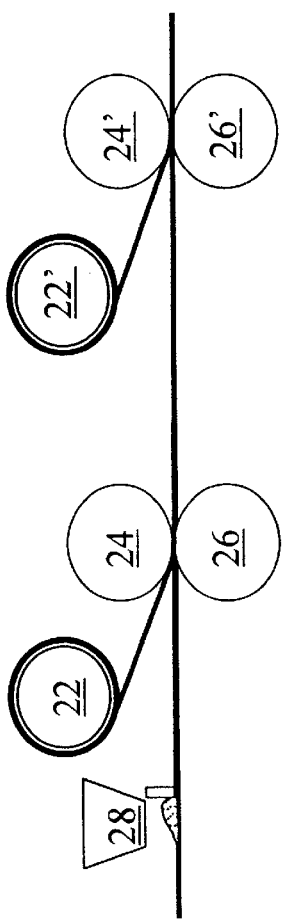
Figure 18

DOUBLE-LAYER CAPACITOR COMPONENTS AND METHOD FOR PREPARING THEM

TECHNICAL FIELD

The invention relates to materials of construction suitable for electrochemical double-layer capacitor components of improved structure and to processes for preparing them and component parts utilizing them.

BACKGROUND OF THE INVENTION

Double-layer electrochemical capacitors provide energy storage and pulse power delivery for a number of stationary and mobile power needs. Supercapacitors can store and release large bursts of energy and can be useful in many environments including external power sources and as complements to power sources such as fuel cells and the like. The unique advantages of these devices make them promising for many power applications. To maximize their usefulness, a balance must be struck between weight and performance, and it would be desirable to adjust manufacturing procedures of current construction materials to assure that both concerns are effectively addressed to provide a net improvement in the operation and/or economy of these devices.

Double-layer capacitors, sometimes also called electrochemical ultracapacitors or supercapacitors, are capable of rapidly charging to store significant amounts of energy and then delivering the stored energy in bursts on demand. To be useful, they must, among other properties, have low internal resistance, store large amounts of charge and be physically strong per unit weight. There are, therefore, a large number of design parameters that must be considered in their construction. It would be desirable to enable procedures for producing starting materials for producing component parts that would address these concerns such that the final supercapacitor assembly could be more effective on a weight and/or cost basis.

Double-layer capacitors generally include two porous electrodes, kept from electrical contact by a porous separator. Both the separator and the electrodes are immersed within an electrolyte solution. The electrolyte is free to flow through the separator, which is designed to prevent electrical contact between the electrodes and creating a short circuit in the cell. Current collecting plates are in contact with the backs of active electrodes. Electrostatic energy is stored in polarized liquid layers, which form when a potential is applied across two of the electrodes. A double layer of positive and negative charges is formed at the electrode-electrolyte interface.

The use of graphite electrodes in electrochemical capacitors with high power and energy density provides a number of advantages, but economics and operating efficiency are in need of improvement. Fabrication of double layer capacitors with carbon electrodes is known. See, for example, U.S. Pat. No. 6,094,788, to Farahmandhi, et al., U.S. Pat. No. 5,859,761, to Aoki, et al., U.S. Pat. No. 2,800,616, to Becker, and U.S. Pat. No. 3,648,126, to Boos, et al. The art has been utilizing graphite electrodes—but not flexible graphite sheets—for capacitors of this type for some time and is still facing challenges in terms of material selection and processing. While various attempts have been made to achieve good electrical, physical and electrochemical properties, the art is in need of improvements and the provision of alternative electrochemical capacitors and components effective for various arrangements of electrochemical elements and materials.

A continuing problem in many carbon electrode capacitors, including double-layer capacitors, is that the performance of the capacitor is limited because of the internal resistance of the carbon electrodes. While the use of carbon in the form of flexible graphite sheet has several advantages, it is desired to further reduce cell internal resistance. Internal resistance is influenced by several factors, including the high contact resistance of the internal carbon-carbon contacts, the contact resistance of the electrodes with a current collector, the surface and internal pore structure of the carbon and the material thickness. Because high resistance translates to large energy losses in the capacitor during charging and discharge, and these losses further adversely affect the characteristic RC (resistance x capacitance) time constant of the capacitor and interfere with its ability to be efficiently charged and/or discharged in a short period of time, it would be desirable to provide construction materials and methods that would facilitate reductions in the internal resistance.

There remains a need in the art for a material which can be used in preparing electrochemical double-layer capacitors having improved properties due to the use of novel components and processing.

SUMMARY OF THE INVENTION

Accordingly, it is an object of the invention to provide a material that can be used in preparing a flexible graphite articles useful as components in electrochemical supercapcitors.

It is an object of the invention to resolve some of the art recognized problems in the construction and operation of electrochemical double-layer capacitors as outlined, in part, above and elsewhere.

It is a general object of the invention to provide improved electrochemical capacitors.

It is another general object of the invention to provide improved components for electrochemical double-layer capacitors.

It is another object of some embodiments of the invention to provide improved components for electrochemical double-layer capacitors that are stable in the presence of strong acids.

These and other objects are accomplished by the present invention, which provides electrochemical double-layer capacitors.

In one aspect, the invention provides an electrochemical double-layer capacitor comprising: two paired electrodes wetted with an electrolyte, each electrode being in contact with a current collector comprised of flexible graphite sheet and being separated from the other of the paired electrodes by a separator layer porous to the electrolyte. The current collector further can comprise a layer of tanged metal, and in some embodiments is integral with the electrode. In some embodiments, the electrode comprises a fibrous carbon material such as carbon fabric or carbon paper. In other embodiments, the electrode comprises flexible graphite sheet, which can be impregnated with a material, e.g., a metal, effective to modify its conductivity.

In another aspect, the invention provides an electrochemical double-layer capacitor comprising: two paired electrodes comprising graphite, both wetted with an electrolyte, each electrode being in contact with a current collector comprising tanged metal and being separated from the other of the paired electrodes by a separator layer porous to the electrolyte. In some embodiments, the graphite comprises a fibrous material such as carbon fabric or carbon paper. In other embodiments, the electrode comprises flexible graphite sheet. In some embodiments, the graphite is impregnated with a material, e.g., a metal, effective to modify its conductivity.

In another aspect the invention provides an electrochemical double-layer capacitor comprising: two paired electrodes comprising flexible graphite, both wetted with an electrolyte, each electrode being in contact with a current collector and being separated from the other of the paired electrodes by a separator layer porous to the electrolyte. In some embodiments, the electrode is integral with the current collector. In some embodiments, the current collector comprises a layer of tanged metal. In certain embodiments, the electrode is integral with the current collector and can be impregnated with a material effective to modify its conductivity.

In another aspect, the invention provides improvements in an electrochemical double-layer capacitor of the type comprising at least two electrodes wetted with an electrolyte, each electrode being in contact with a current collector and being separated from an adjacent electrode by a separator layer porous to the electrolyte, the improvement comprising: as an electrode, a current collector or a combined electrode and current collector, an integral sheet of tanged metal and flexible graphite. In some embodiments, the composite is comprised in an electrode. In some, the composite is comprised in a combined current collector and electrode. And, in others, the composite is comprised in a current collector.

According to the process of the invention, composite materials useful as components in electrochemical supercapcitors and as described above are processed in the manner described below.

Many preferred and alternative aspects of the invention, including preferred components and aspects of processing are described below.

BRIEF DESCRIPTION OF THE DRAWINGS

The present invention will be better understood and its advantages more apparent in view of the following detailed description, especially when read with reference to the appended drawings, wherein:

FIG. 17 is a schematic, exploded representation of five layers of material employed to prepare an electrochemical double-layer capacitor of the invention, in this case including composite sheets of flexible graphite and tanged metal current collectors and sheets of fibrous graphite for the electrodes.

FIG. 18 is a schematic of a process for preparing a composite material of the type useful in a cell comprised of the layers illustrated in FIG. 17, useful in an electrochemical double-layer capacitor of the invention.

FIG. 19 is a cross-sectional, detailed view of a portion of a composite of invention as prepared in FIG. 18.

FIG. 20 is a cross-sectional, detailed view of a portion of a composite of invention similar to that in FIG. 19, but having two fabric electrodes partially embedded in a composite current collector.

FIG. 21 is a schematic, cross-sectional view of an electrochemical double-layer capacitor of the invention including several stacks of cells connected in series.

DETAILED DESCRIPTION OF THE INVENTION

Figure 3:
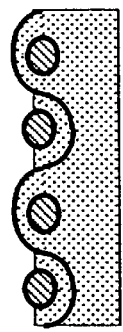
FIG. 3 is a cross-sectional, detailed view of a portion of a composite of invention as prepared in FIG. 2.
Figure 4:
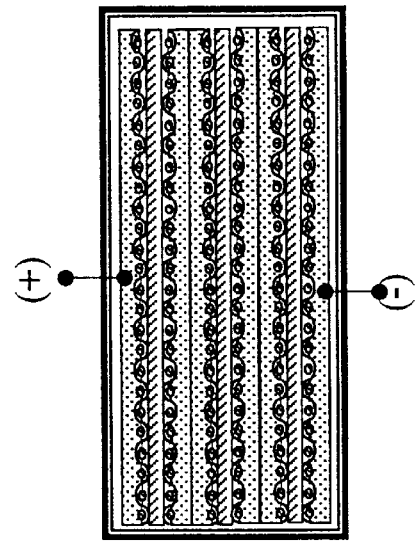
FIG. 4 is a schematic, cross-sectional view of an electrochemical double-layer capacitor of the invention including several stacks of cells connected in series.
Figure 1:
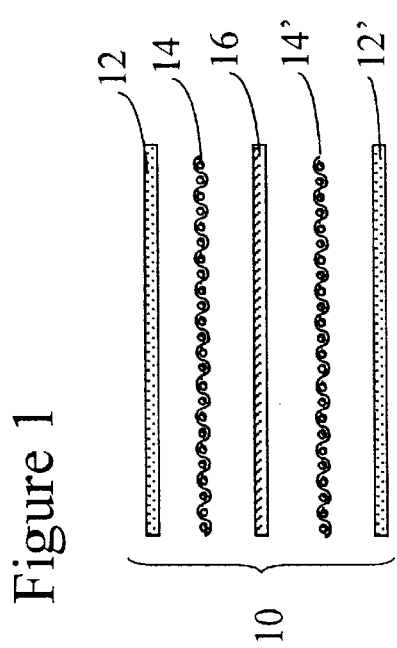
FIG. 1 is a schematic, exploded representation of five layers of material employed to prepare an electrochemical double-layer capacitor of the invention, in this case including sheets of fibrous graphite for the electrodes and tanged metal sheets for the current collectors.

The invention will be illustrated and explained in this description by specific reference to the production components for use in electrochemical double-layer capacitors which utilize at least one layer of a flexible graphite sheet material in an electrode or current collector or which utilize a tanged metal layer in a current collector. It will be recognized, that while this description is made with regard to specific capacitor and component structures for illustrative purposes, the invention has broader applicability and is useful in the production of different structures.

The use of flexible graphite sheet for, components for use in electrochemical double-layer capacitors is highly advantageous due to its thermal and electrical conductivity, its low weight with good strength, its resistance to chemicals commonly employed in components for use in electrochemical double-layer capacitors, and generally its properties which can help mitigate the many problems identified above and in the art. By the term flexible graphite we mean to define those sheet and foil materials described in U.S. Pat. No. 3,404,061 and the products made using the techniques taught therein which are commercially available, for example, under the trademark GRAFOIL® from Graftech, Inc.

Before describing the manner in which the invention improves current materials, a brief description of graphite and its formation into flexible sheets, which will become the component parts of the materials of the invention is in order.

Preparation of Flexible Graphite Sheet

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be intercalated and exfoliated, is suitable for use with the present invention. Such graphite preferably has an ash content of less than 20% (weight), and for electrochemical uses less than 6% is often desired. More preferably, the graphite employed for the present invention will have a purity of at least about 98%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. The intercalation solution may also contain metal halides such as ferric chloride, and ferric chloride mixed with sulfuric acid, or a halide, such as bromine, as a solution of bromine and sulfuric acid or bromine, in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10-decanediol, decylaldehyde, 1-propanol, 1,3-propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 250 to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet is coherent, with good handling strength, and are suitably compressed, e.g. by roll-pressing, to a thickness of about 0.05 mm to 4 mm and a typical density of about 0.1 to 1.4 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Preparation Of Composite Materials For Use In Electrochemical Double-Layer Capacitors FIGS. 1–8 and 17–21 illustrate embodiments of one aspect of the invention which provides an electrochemical double-layer capacitor comprising two paired electrodes 14 and 14', wetted with an electrolyte (not shown, but of a type described for example in any of the patents identified above, which are hereby incorporated by reference). Each electrode is in contact with a current collector 12 or 12' comprised of flexible graphite sheet and being separated from the other of the paired electrodes by a separator layer 16 porous to the electrolyte. The separator layer is of any suitable nonconductive material, such as polyethylene or polypropylene having a suitable porosity as known in the art. See for example, U.S. Pat. No. 5,907,472, which is hereby incorporated by reference in its entirety, for a description of suitable separator materials and constructions. The current collector 12 can comprise a sheet of tanged metal as is illustrated in FIGS. 9–21.

Figure 2:
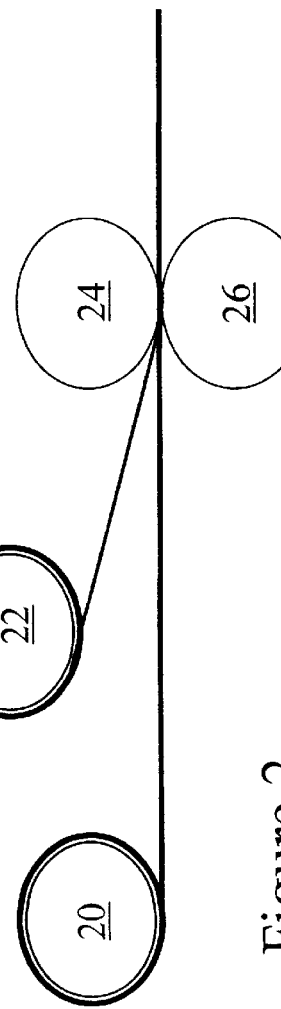
FIG. 2 is a schematic of a process for preparing a composite material of the type useful in a cell comprised of the layers illustrated in FIG. 1, useful in an electrochemical double-layer capacitor of the invention.
Figure 7:
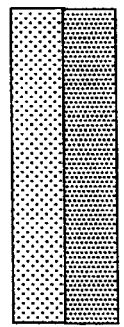
FIG. 7 is a cross-sectional, detailed view of a portion of a composite of invention as prepared in FIG. 6.
Figure 8:
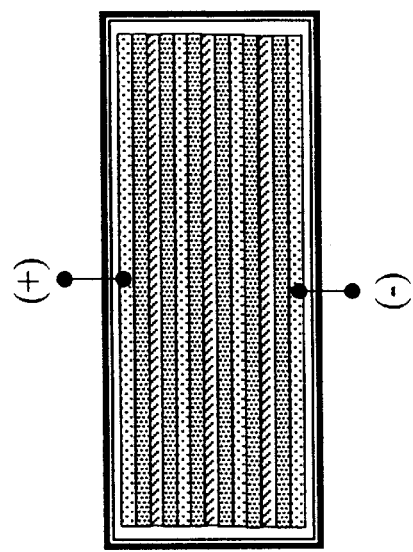
FIG. 8 is a schematic, cross-sectional view of an electrochemical double-layer capacitor of the invention including several stacks of cells connected in series.
Figure 5:
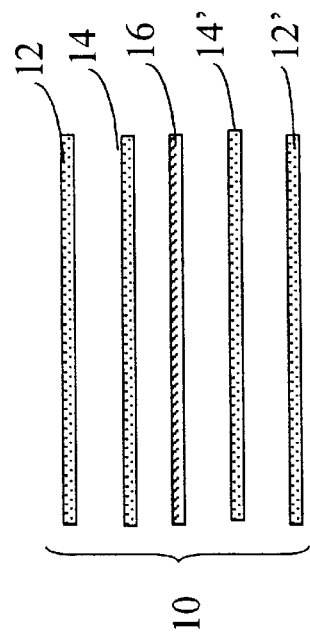
FIG. 5 is a schematic, exploded representation of five layers of material employed to prepare an electrochemical double-layer capacitor of the invention, in this case including sheets of flexible graphite for the electrodes and the current collectors.
Figure 6:
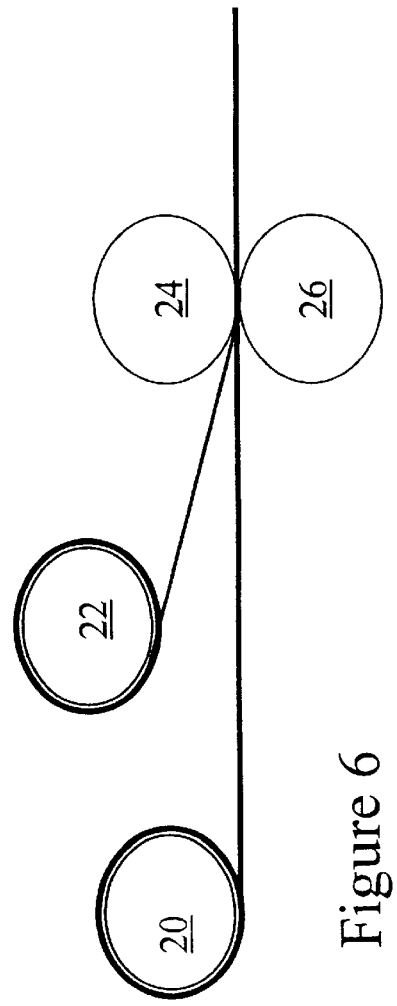
FIG. 6 is a schematic of a process for preparing a composite material of the type useful in a cell comprised of the layers illustrated in FIG. 5, useful in an electrochemical double-layer capacitor of the invention.

In the embodiments of FIGS. 3, 7, 11, 15, 19 and 20, the current collector is integral with the electrode. This can be accomplished as shown in the related process FIGS. 2, 6, 10, 14 and 18 wherein the materials for the identified layers are run between pressure rollers or compressed in other known manners. FIG. 2 illustrates flexible graphite being fed from a roll 20 and graphite fabric being fed from roll 22 to meet between nip rolls 24 and 26 for forming a composite as illustrated in FIG. 3 wherein the fabric is at least partially embedded in the flexible graphite sheet. Of course, the fabric could be incorporated in the above-described process for forming the flexible graphite sheet.

Some embodiments of the invention are facilitated by the use of resin-impregnated flexible graphite foils in at least layer. To prepare flexible graphite foils by impregnating before final consolidation into the material of the invention, flexible graphite sheet is treated with resin and if needed dried after absorption of the resin. This is a useful binder to ensure cohesiveness of the final product and, after consolidating or curing, enhances the fluid resistance and impermeability, improves the handling strength, i.e. stiffness, of the flexible graphite sheet, as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolac phenolics. Typically, but not necessarily, the resin system is solvated to facilitate application into the flexible graphite sheet.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a starting density of about 0.1 to about 1.1 g/cc, can thereafter processed to change the void condition of the sheet. One form of apparatus for continuously forming resin-impregnated and calendered flexible graphite sheet is shown in International Publication No. WO 00/64808, the disclosure of which is incorporated herein by reference.

In some embodiments, the electrode comprises a fibrous carbon material such as carbon fabric or carbon paper, as illustrated for example as electrodes in FIGS. 1–4 and 13–21. In other embodiments, the electrode comprises flexible graphite sheet, which can be impregnated with a material, e.g., a metal, effective to modify its conductivity. Again, in this regard, reference is made to U.S. Pat. No. 5,907,472, which is hereby incorporated by reference in its entirety.

An intermediate layer may comprise one or more layers of a foraminous material of any suitable construction and material. Typically it will be one selected from the group consisting of woven and nonwoven fabrics or webs, having any suitable structure of individual fibers or threads, films or foils, batts, knitted fabric, and the like, of any suitable metal, plastic or fiber of organic or inorganic composition. Nonwoven fabrics or webs can be formed from many processes such as for example, melt blowing processes, spin bonding processes, and bonded carded web processes. By definition, the foraminous material will permit the passage of a fluid from one surface through to the other. The material will have openings through it to facilitate this, but the size, shape and arrangement of the openings can be selected as desired for the final article characteristics. It is an advantage of the invention that foraminous materials of all kinds can be employed. Desirable foraminous materials will have integral means or shapes that facilitate mechanical or other physical bonding between the graphite layers and the foraminous layer or layers.

Figure 9:
FIG. 9 is a schematic, exploded representation of five layers of material employed to prepare an electrochemical double-layer capacitor of the invention, in this case including sheets of flexible graphite for the electrodes and tanged metal sheets for the current collectors.
Figure 11:
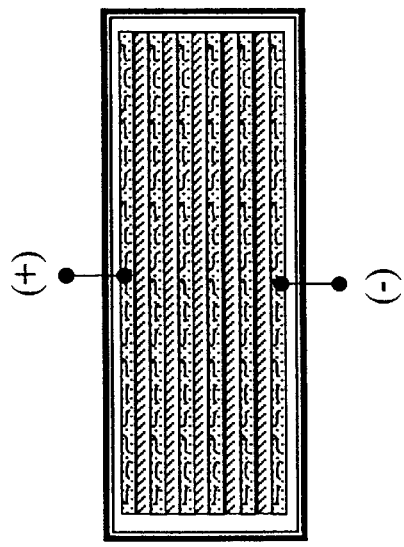
FIG. 11 is a cross-sectional, detailed view of a portion of a composite of invention as prepared in FIG. 10.
Figure 12:
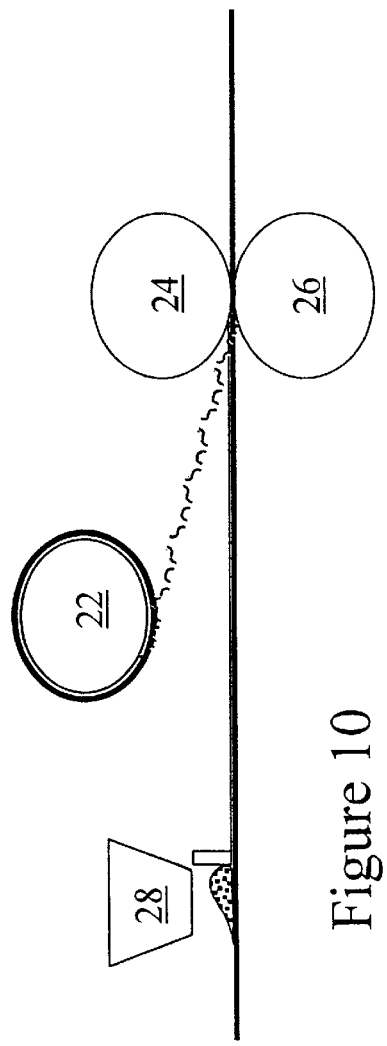
FIG. 12 is a schematic, cross-sectional view of an electrochemical double-layer capacitor of the invention including several stacks of cells connected in series.
Figure 10:
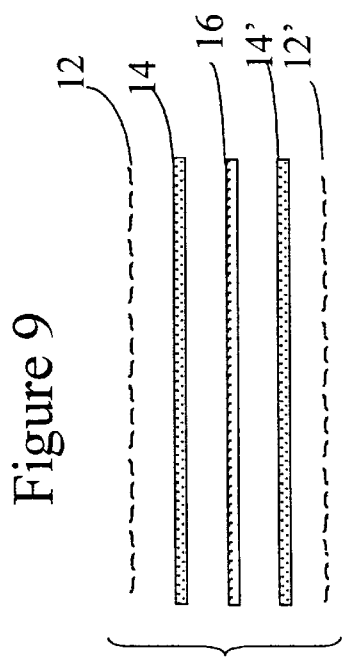
FIG. 10 is a schematic of a process for preparing a composite material of the type useful in a cell comprised of the layers illustrated in FIG. 9, useful in an electrochemical double-layer capacitor of the invention.
Figure 16:
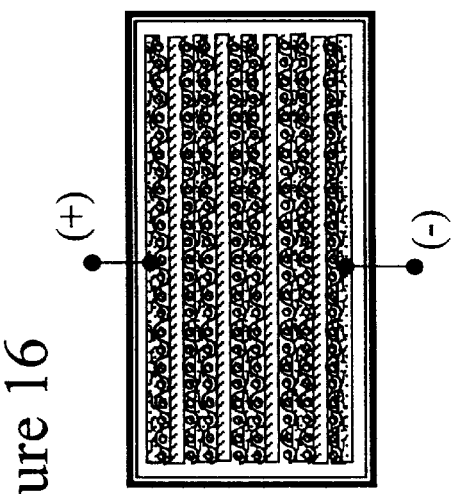
FIG. 16 is a schematic, cross-sectional view of an electrochemical double-layer capacitor of the invention including several stacks of cells connected in series.
Figure 15:
FIG. 15 is a cross-sectional, detailed view of a portion of a composite of invention as prepared in FIG. 14.
Figure 13:
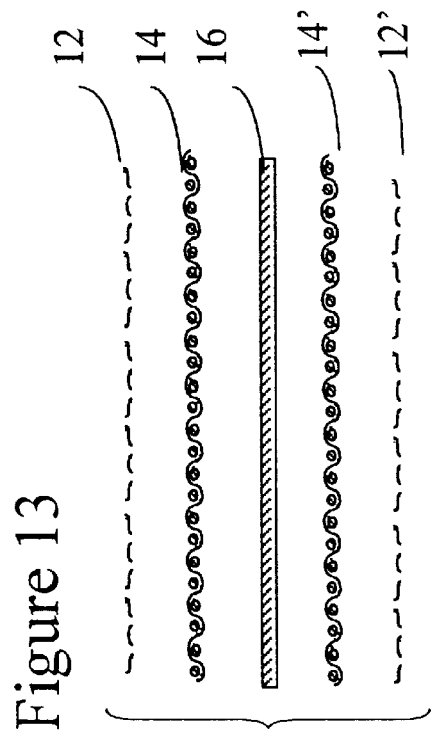
FIG. 13 is a schematic, exploded representation of five layers of material employed to prepare an electrochemical double-layer capacitor of the invention, in this case including sheets of fibrous graphite for the electrodes and tanged metal sheets for the current collectors.
Figure 14:
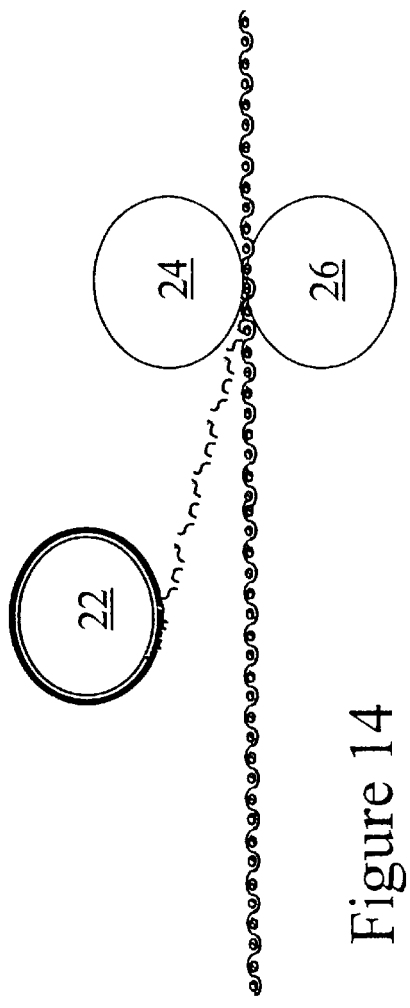
FIG. 14 is a schematic of a process for preparing a composite material of the type useful in a cell comprised of the layers illustrated in FIG. 13, useful in an electrochemical double-layer capacitor of the invention.

In another aspect, the invention as illustrated in FIGS. 9–21 provides an electrochemical double-layer capacitor comprising two paired electrodes 14, 14' comprising graphite, both wetted with an electrolyte, each electrode being in contact with a current collector 12, 12' comprising tanged metal (the sole component of current collectors 12 and 12' in FIG. 9). The electrodes are separated from the other of the paired electrodes by a separator layer 16 porous to the electrolyte, as described above. In some embodiments, the graphite comprises a fibrous material such as carbon fabric or carbon paper. In other embodiments, the electrode comprises flexible graphite sheet. In some embodiments, the graphite is impregnated with a material, e.g., a metal, effective to modify its conductivity.

In another aspect, the invention provides an electrochemical double-layer capacitor comprising: two paired electrodes 12, 12' comprising flexible graphite as illustrated in FIGS. 5–12. Both electrodes are wetted with an electrolyte, and each electrode is in contact with a current collector 14, 14' and are separated from the other of the paired electrodes by a separator layer 16 porous to the electrolyte. In some embodiments, the electrode is integral with the current collector. In some embodiments, the current collector comprises a layer of tanged metal. In certain embodiments, the electrode is integral with the current collector and can be impregnated with a material effective to modify its conductivity.

In another aspect, as illustrated for example in FIGS. 9–12 and 17–21, the invention provides improvements in an electrochemical double-layer capacitor of the type comprising at least two electrodes wetted with an electrolyte, each electrode being in contact with a current collector and being separated from an adjacent electrode by a separator layer porous to the electrolyte, the improvement comprising: as an electrode, a current collector or a combined electrode and current collector, an integral sheet of tanged metal and flexible graphite. This composite sheet is shown best in FIG. 11 wherein the tanged metal sheet 100 is at least partially embedded in sheet 102 of flexible graphite. In some embodiments, the composite is comprised in an electrode. In some, the composite is comprised in a combined current collector and electrode. And, in others, the composite is comprised in a current collector.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. An electrochemical double-layer capacitor comprising: two paired electrodes wetted with an electrolyte, each electrode being in contact with a current collector comprised of a flexible graphite sheet and a layer of tanged metal and being separated from the other of the paired electrodes by a separator layer porous to the electrolyte.

2. An electrochemical double-layer capacitor of claim 1 wherein each electrode is integral with the respective current collector.

3. An electrochemical double-layer capacitor of claim 1 wherein each electrode is integral with the respective current collector.

4. An electrochemical double-layer capacitor of claim 3 wherein each electrode comprises a fibrous carbon material.

5. An electrochemical double-layer capacitor of claim 4 wherein each electrode comprises carbon fabric.

6. An electrochemical double-layer capacitor of claim 4 wherein each electrode comprises carbon paper.

7. An electrochemical double-layer capacitor of claim 4 wherein the fibrous carbon material is impregnated with a material effective to modify its conductivity.

8. An electrochemical double-layer capacitor of claim 7 wherein the fibrous carbon material is impregnated with a metal.

9. An electrochemical double-layer capacitor of claim 3 wherein each electrode comprises a flexible graphite sheet.

10. An electrochemical double-layer capacitor comprising:
two paired electrodes comprising graphite, both wetted with an electrolyte, each electrode being in contact with a current collector comprising tanged metal and being separated from the other of the paired electrodes by a separator layer porous to the electrolyte.

11. An electrochemical double-layer capacitor of claim 10 wherein the graphite comprises a fibrous material.

12. An electrochemical double-layer capacitor of claim 11 wherein each electrode comprises carbon fabric.

13. An electrochemical double-layer capacitor of claim 11 wherein each electrode comprises carbon paper.

14. An electrochemical double-layer capacitor of claim 10 wherein each electrode comprises a flexible graphite sheet.

15. An electrochemical double-layer capacitor of claim 10 wherein the graphite is impregnated with a material effective to modify its conductivity.

16. An electrochemical double-layer capacitor of claim 15 wherein the graphite is impregnated with a metal.

17. An electrochemical double-layer capacitor comprising:
two paired electrodes comprising flexible graphite, both wetted with an electrolyte, each electrode being in contact with a current collector comprising a layer of tanged metal and being separated from the other of the paired electrodes by a separator layer porous to the electrolyte.

18. An electrochemical double-layer capacitor of claim 17 wherein each electrode is integral with the respective current collector.

19. An electrochemical double-layer capacitor of claim 17 wherein each-electrode is integral with the current collector.

20. An electrochemical double-layer capacitor of claim 19 wherein the flexible graphite is impregnated with a material effective to modify its conductivity.

21. In an electrochemical double-layer capacitor of the type comprising at least two electrodes wetted with an electrolyte, each electrode being in contact with a current collector and being separated from an adjacent electrode by a separator layer porous to the electrolyte, the improvement comprising:
as an electrode, a current collector or a combined electrode and current collector, an integral sheet of tanged metal and flexible graphite.

22. An improvement according to claim 21 wherein each composite is comprised in an electrode.

23. An improvement according to claim 21 wherein each composite is comprised in a current collector.

24. An improvement according to claim 21 wherein each composite is comprised in a combined current collector and electrode.

* * * * *